United States Patent [19]

Tayloe

[11] Patent Number: 5,649,291
[45] Date of Patent: Jul. 15, 1997

[54] COMMUNICATION SYSTEM AND METHOD USING SUBSCRIBER UNITS TO EVALUATE HAND-OFF CANDIDATES

[75] Inventor: Daniel Richard Tayloe, Phoenix, Ariz.

[73] Assignee: Motorola, Inc., Schaumburg, Ill.

[21] Appl. No.: 431,005

[22] Filed: Apr. 28, 1995

[51] Int. Cl.$^6$ .................................................. H04Q 7/00
[52] U.S. Cl. ...................... 370/332; 455/437; 455/429; 455/334; 455/12.1
[58] Field of Search ............................. 455/33.2, 12.1, 455/13.1, 13.3, 56.1, 33.1; 379/60; 370/50, 95.1, 95.3

[56] References Cited

U.S. PATENT DOCUMENTS

| 4,556,760 | 12/1985 | Goldman | 455/56 |
|---|---|---|---|
| 5,504,938 | 4/1996 | Redden | 455/33.4 |

Primary Examiner—Reinhard J. Eisenzopf
Assistant Examiner—Darnell R. Armstrong
Attorney, Agent, or Firm—Gregory J. Gorrie

[57] ABSTRACT

A cellular telecommunication network (10) includes base stations located in satellites (12) orbiting the earth and includes any number of subscriber units (26). Each satellite (12) receives cell cluster lists (54) that are valid for cells (28) the satellite (12) projects toward the earth and for predetermined periods of time. Each cell cluster list (54) includes target cell entries (60) that identify cells (28) into which subscriber units (26) operating in a local cell (28) may request a hand-off. The entries (60) identify communication channels associated with the target cells. Upcoming communication channel changes are indicated as separate entries (60) for identical cells (28). Subscriber units (26) receive the list (54) and evaluate the communication channels for the local cell and the target cells in order to make a hand-off decision.

11 Claims, 9 Drawing Sheets

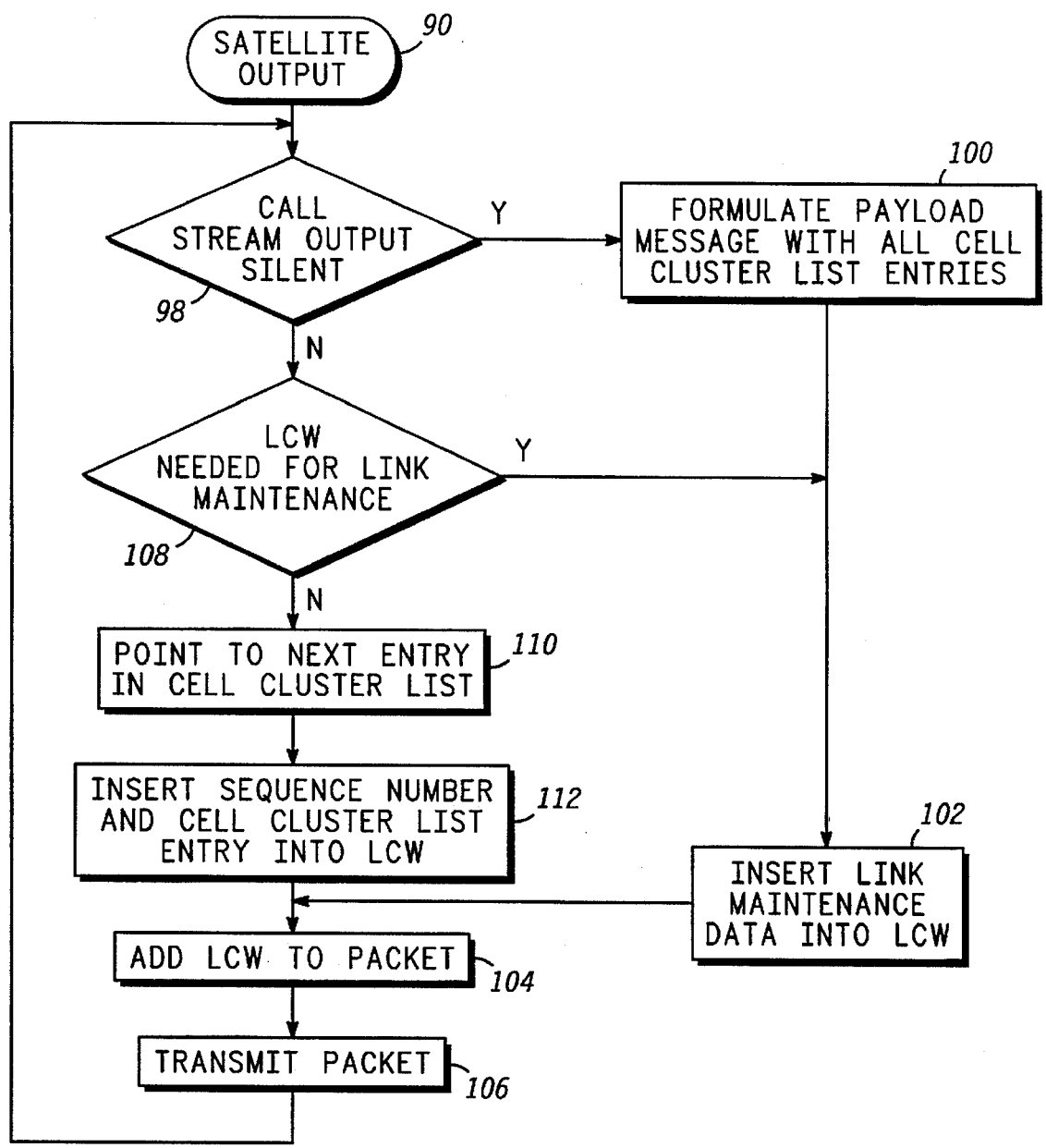
FIG. 6
FIG. 7
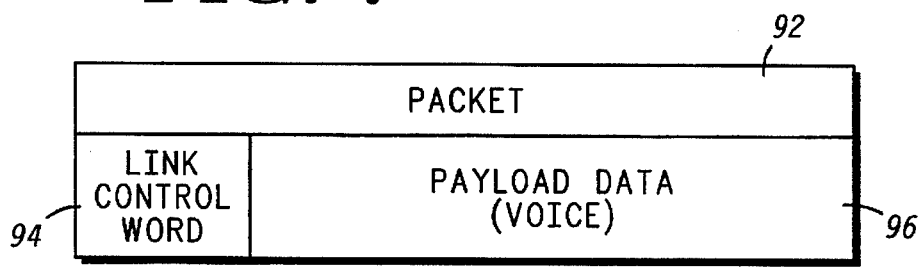

| INDEX | CELL ENTRY | LINK | IRSS | ARSS |
|---|---|---|---|---|
| | CELL CLUSTER LIST | | | |
| 0 | 56 | | | |
| 1 | 60 | | | |
| 2 | 60 | | | |
| 3 | 60 | | | |
| 4 | 60 | | | |
| 5 | 60 | | | |
| 6 | 60 | | | |
| 7 | 60 | | | |

COMMUNICATION SYSTEM AND METHOD USING SUBSCRIBER UNITS TO EVALUATE HAND-OFF CANDIDATES

RELATED INVENTIONS

The present invention is related to the following inventions which are assigned to the same assignee as the present invention:

(1) "Satellite Cellular Communication Methods For Performing Cell-To-Cell Handoff", having Ser. No. 08/252,472, filed Jun. 1, 1994; and (2) "Method of Pre-Computation of Candidate Handoff Cell List For Cellular Communications", having Ser. No. 08/431,006, filed on even day herewith.

The subject matter of the above-identified related inventions is hereby incorporated by reference into the disclosure of this invention.

TECHNICAL FIELD

The present invention relates generally to the field of cellular radio communications and, more specifically, to processes and devices utilized in handing off calls from one cell to another.

BACKGROUND OF THE INVENTION

In the field of cellular communications, mobile subscriber units located in one cell communicate with a base station over a first set of communication channels. In adjacent cells, mobile subscriber units communicate with base stations over different sets of communication channels. When, during the course of a call, movement causes a mobile subscriber unit to cross a boundary between cells, the call is "handed-off" from a communication channel associated with one cell to a communication channel associated with another cell. The hand-off operation requires base stations to alter their allocation of communication channel resources and causes the mobile subscriber unit to retune its transmitter and receiver to a new channel while the call is ongoing. Desirably, these operations are carried out without the call being dropped or otherwise interrupted and without unnecessarily wasting scarce communication channel resources.

The hand-off process has conventionally been a delicate operation which has undergone continuous refinement. The hand-off process includes the creation and implementation of rules which are followed in deciding when to perform a hand-off, selecting which communication channel can receive a handed-off call, and successfully transferring an ongoing call between communication channels. Some aspects of the continuous refinement result from an ongoing desire to enhance system performance.

However, other aspects of the continuous refinement result from inevitable changes which take place in the overall cellular system structure from time to time. For example, a frequency reuse plan may change from time to time, redefining an existing association of communication channels to cells. The hand-off process often needs to evolve to reflect the change.

Due to a continuing need for refinement and a need to provide consistently good service, conventional cellular systems implement their hand-off processes centrally under the control of the communication service providers. Mobile subscriber units are typically not under the communication service providers' control and lack the information which drives hand-off decision rule evolution. Thus, mobile subscriber units conventionally play only a minor role in the hand-off process. For example, a mobile subscriber unit may, when instructed by a base station, make signal strength measurements and report the measurements back to the base station. However, the base station and other system components follow hand-off decision rules and instruct the mobile subscriber unit to retune its transmitter and receiver at a time and to a channel dictated by the decision rules.

In the face of an upcoming cellular system structural change, such as a change in the frequency reuse plan, system components and not mobile subscriber units have a priori knowledge of the changes and can modify decision rules to minimize call droppage which might otherwise occur due to hand-offs performed in accordance with stale rules. Alternately, if such changes occur rarely, a cellular system may simply tolerate operation for a short duration on stale decision rules, but schedule the change to occur when massive numbers of dropped calls will be avoided, such as in the middle of the night.

Unfortunately, conventional "centralized" hand-off techniques are unsuitable for cellular systems in which base stations are located in satellites orbiting the earth. Enormous costs are associated with placing a satellite in orbit, and base stations that are not simple, light-weight, highly reliable, and low-power are not commercially competitive. Conventional centralized hand-off techniques prevent base stations from having these characteristics due, at least in part, to the need to incorporate sufficient processing power to implement hand-off decision rules for all channels supported by the base stations.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 6 shows a flow chart of a satellite output process performed by the base station located in a satellite;

FIG. 7 shows a data format diagram of an exemplary packet which the cellular telecommunication system may use to organize data it conveys between source and destination nodes;

DETAILED DESCRIPTION OF A PREFERRED EMBODIMENT

Figure 1:
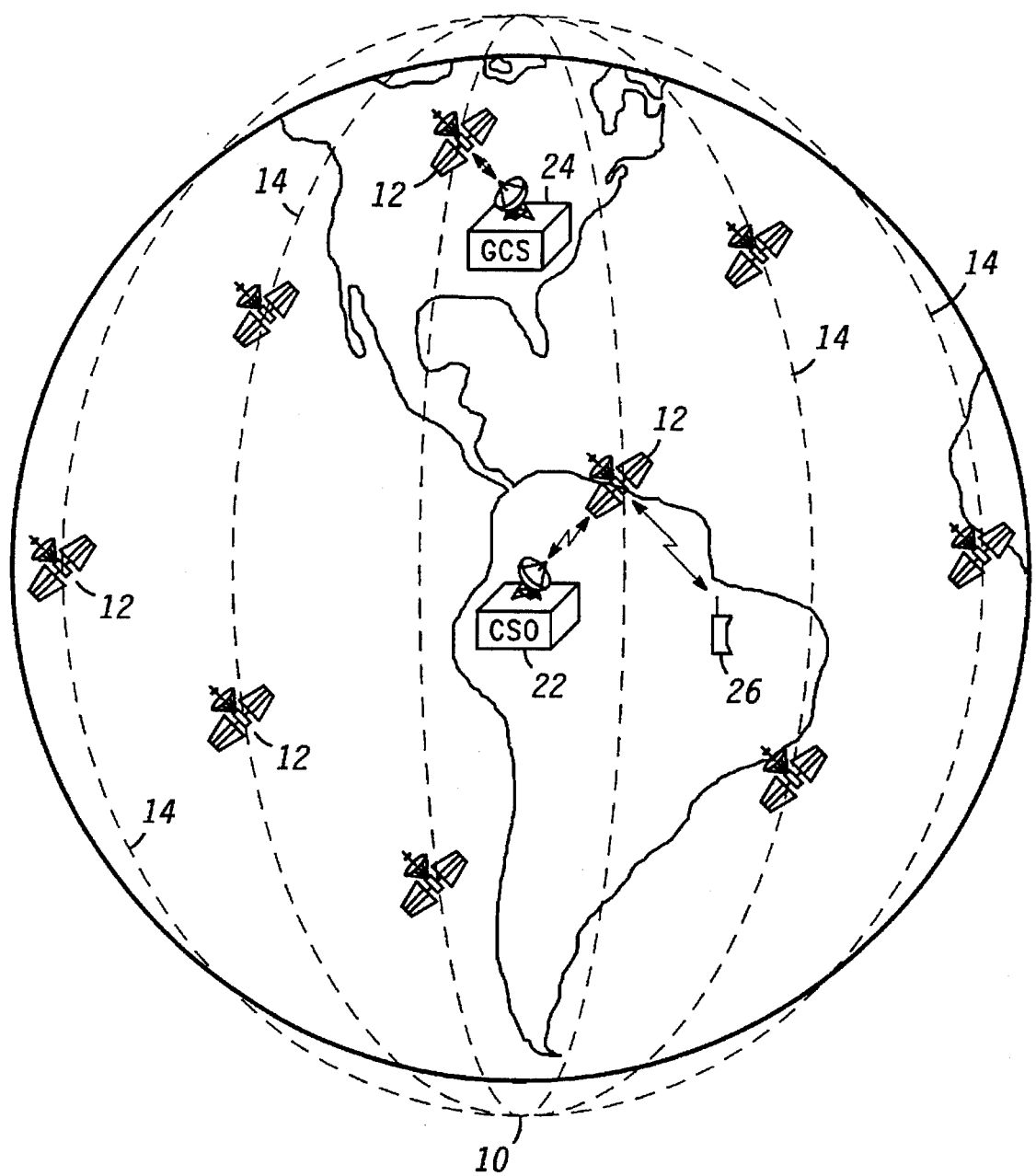
FIG. 1 shows a block diagram of an environment within which a cellular telecommunication system may be implemented.

FIG. 1 illustrates a satellite-based cellular communication or telecommunication system or network 10. Network 10 is dispersed over the earth through the use of a constellation of above-the-earth base stations located in satellites 12. In a currently preferred embodiment, satellites 12 occupy polar, low-earth orbits 14. In particular, a preferred embodiment of network 10 uses six polar orbital planes, with each orbit holding eleven satellites 12 for a total of sixty-six satellites 12. For clarity, FIG. 1 illustrates only a few of these satellites 12.

Orbital planes 14 and satellites 12 are distributed around the earth. In a currently preferred embodiment, each orbit 14 encircles the earth at an altitude of around 765 km. Due to these relatively low orbits, substantially line-of-sight electromagnetic transmissions from any one satellite cover a relatively small area of the earth at any point in time. For example, when satellites 12 occupy orbits at around 765 km above the earth, such transmissions may cover "footprint" areas around 5000 km in diameter.

Due to the low-earth character of orbits 14, satellites 12 travel with respect to the earth at around 25,000 km/hr. This allows a satellite 12 to be within view of a point on the surface of the earth for a maximum period of around nine to ten minutes. Moreover, the polar orbits 14 within which satellites 12 travel cause satellites 12 to converge toward one another longitudinally while approaching the polar regions and to diverge away from one another longitudinally while approaching the equator.

Satellites 12 communicate with devices on the ground through many central switching offices (CSOs) 22, of which FIG. 1 shows only one, a few ground control stations (GCSs) 24, of which FIG. 1 shows only one, and any number of radio communication or telecommunication subscriber units (SUs) 26, of which one is shown in FIG. 1. CSOs 22, GCSs 24, and subscriber units 26 may be located anywhere on or near the surface of the earth.

GCSs 24 preferably perform telemetry, tracking, and control (TT&C) functions for the constellation of satellites 12. Preferably, CSOs 22 operate as communication nodes in network 10. Diverse terrestrial-based communications systems, such as the worldwide public switched telecommunications network (not shown), may access network 10 through CSOs 22. Due to the configuration of the constellation of satellites 12, at least one satellite 12 is generally within view of each point on the surface of the earth at all times. Accordingly, network 10 may establish a communication circuit through the constellation of satellites 12 between any two subscriber units 26, between any subscriber unit 26 and a CSO 22, or between any two CSOs 22.

Figure 2:
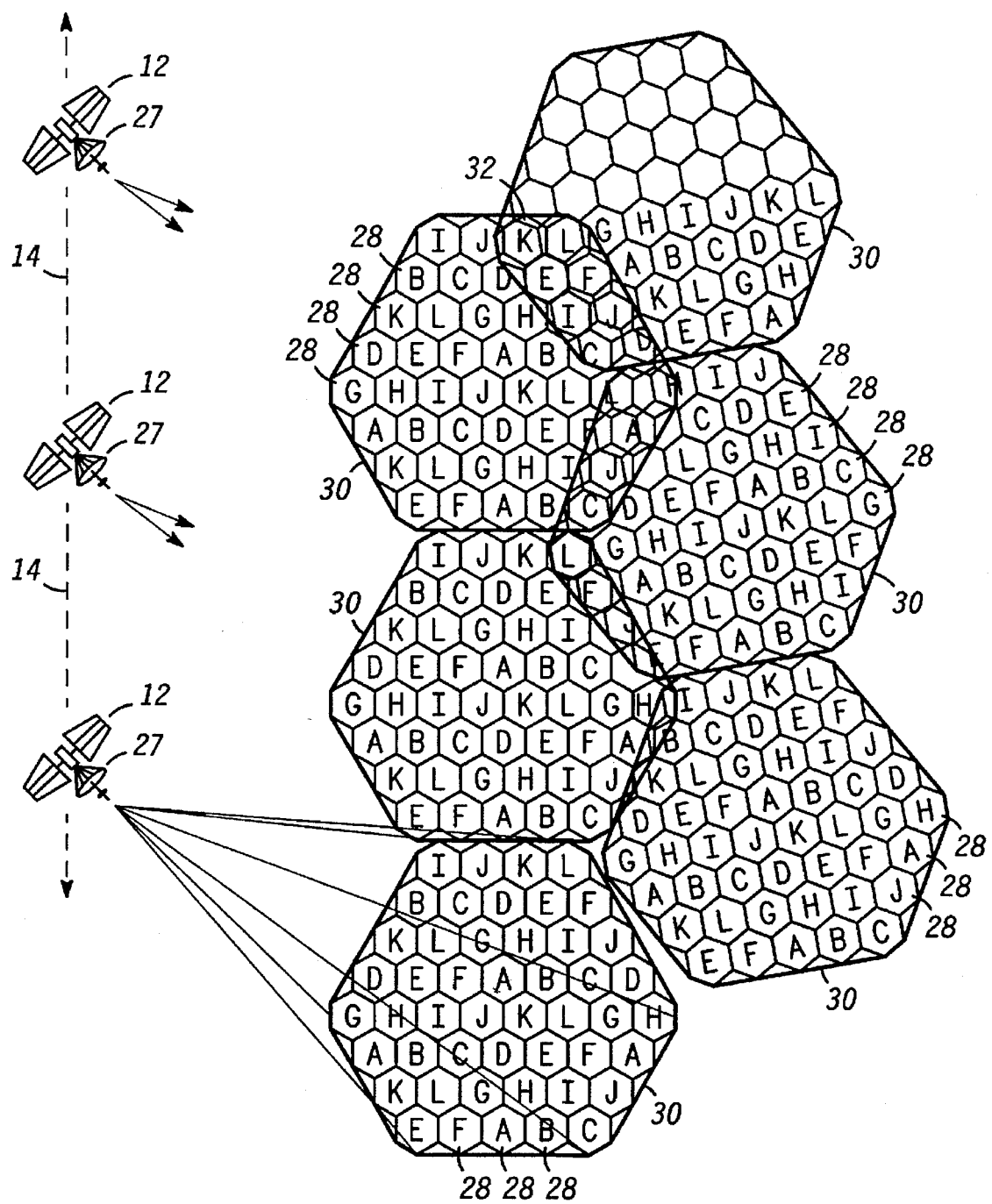
FIG. 2 shows a schematic view of an overlapping pattern of cells projected toward the surface of the earth from a few base stations located in satellites.

FIG. 2 shows a static layout diagram of an exemplary cellular antenna pattern achieved by six of satellite base stations 12, wherein three of the six satellites are sequentially positioned in one orbit 14 and another three of the six satellites 12 are sequentially positioned in an adjacent orbit 14. For clarity, FIG. 2 depicts only the first three of these six satellites 12 in one orbit 14.

Each satellite 12 includes an array of directional antennas 27. Each antenna array 27 projects numerous discrete antenna patterns toward the earth's surface at numerous diverse angles away from its satellite 12. FIG. 2 shows a schematic diagram of a resulting pattern of cells 28 that satellites 12 collectively form on the surface of the earth. With satellites 12 positioned at 765 km above the earth, cells 28 may have a diameter generally in the 400–800 km range. With satellites 12 traveling at speeds of up to 25,000 km/hr with respect to the earth, cells 28 also travel over the earth close to this speed, and any given point on the surface of the earth resides within a single cell 28 for less than a couple of minutes. Regardless of any movement relative to the earth by SUs 26 (see FIG. 1), network 10 may expect to engage in an extensive number of hand-offs due to satellite 12 and cell 28 movement, and the average call will experience at least one and quite possibly many more hand-offs.

The pattern of cells 28 which a single satellite 12 projects on the earth's surface is referred to as a footprint 30. FIG. 2 illustrates an overlap 32 which results from the above-discussed longitudinal convergence of orbits 14. The size of overlap 32 varies in response to the relative location of the overlapping footprints 30. As can be determined by reference to FIGS. 1–2, the greatest amount of overlap 32 occurs in the polar regions of the earth while little or no overlap occurs in the equatorial regions of the earth. FIG. 2 represents a static snap-shot of footprints 30. The portion of overlap 32 which is associated with any two footprints 30 changes as satellites 12 move within orbits 14.

For each instant in time, network 10 defines each cell 28 as being either active or inactive. Active cells may be viewed as being turned "on" while inactive cells may be viewed as being turned "off". Inactive cells 28 reside in overlap region 32, and cells 28 are dynamically switched to active and inactive states as satellites 12 orbit the earth. Satellites 12 refrain from broadcasting transmissions within inactive cells 28.

For convenience, FIG. 2 illustrates cells 28 and footprints 30 as being discrete, generally hexagonal shapes without overlap or gaps, other than those attributed to the longitudinal convergence of orbits 14 near the polar regions of the earth and the longitudinal divergence of orbits 14 near the equatorial regions of the earth. However, those skilled in the art will understand that in actual practice equal strength lines projected from the antennas 27 of satellites 12 may be more circular or elliptic than hexagonal, that antenna side lobes may distort the pattern, and that some preferably minor overlap between adjacent cells 28 may be expected.

While a preferred orbital geometry has been described herein, those skilled in the art will appreciate that the base stations which satellites 12 provide for network 10 need not be positioned precisely as described herein. For example, such nodes may be located on the surface of the earth or in orbits other than those described herein. Likewise, the precise number of nodes may vary from network to network.

Satellites 12 communicate with all of subscriber units 26 (see FIG. 1) using a limited amount of the electromagnetic spectrum. The precise parameters of this spectrum are unimportant to the present invention and may vary from network to network. The present invention divides this spectrum into discrete portions, hereinafter referred to as channels or communication channels. These channels are associated together into channel sets. Satellites 12 transmit/receive signals to/from active cells using channel sets assigned to the respective active cells. The precise manner of dividing this spectrum is also unimportant to the present invention. For example, the spectrum may be divided into discrete radio frequency (RF) communication or telecommunication channels or bands, discrete time slots, discrete coding techniques, or a combination of these. Desirably, each of these discrete channel sets is orthogonal to all other channel sets. In other words, simultaneous communications may take place at a common location over every channel in every channel set without significant interference.

FIG. 2 illustrates an exemplary assignment of twelve discrete channel sets to active cells 28. FIG. 2 references the twelve discrete channel sets through the use of the characters "A", "B", "C", "D", "E", "F", "G", "H", "I", "J", "K", and "L". However, the precise number of channel sets into which the spectrum is divided is not important to the present invention, and those skilled in the art will appreciate that a different number of channel sets may be used and that, if a different number is used, the resulting assignment pattern of channel sets to active cells 28 will differ from the assignment pattern depicted in FIG. 2. Likewise, those skilled in the art will appreciate that each channel set may include one channel or any number of orthogonal channels therein, and that nothing requires different channel sets to include the same number of channels therein.

Figure 3:
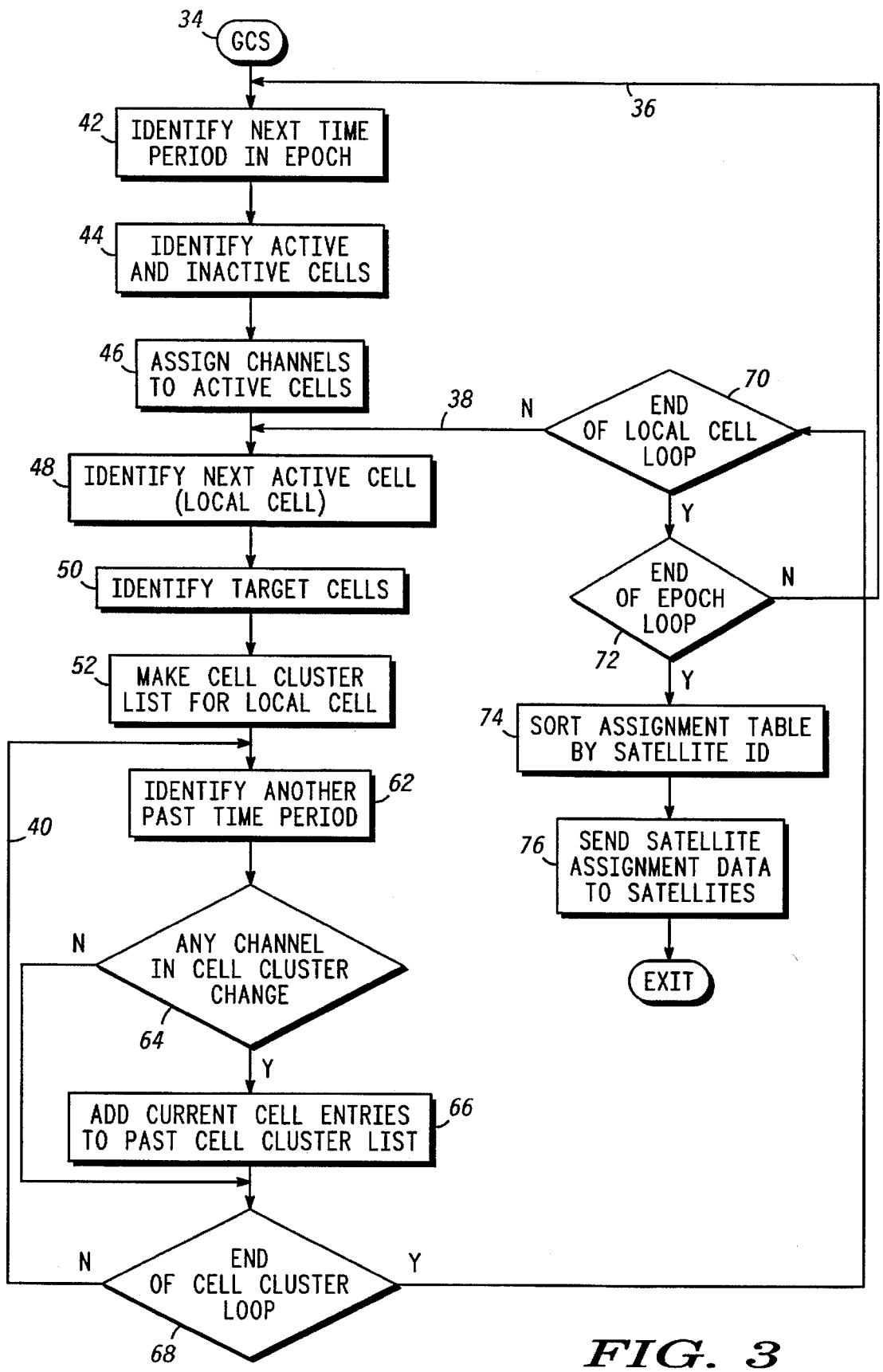
FIG. 3 shows a flow chart of a ground control station (GCS) process performed by a ground control station.

FIG. 3 shows a flow chart of an exemplary ground control station (GCS) process 34 that may be performed by a ground control station 24 (see FIG. 1) or other node of network 10. For the purpose of simplicity, GCS 24 may be viewed as essentially a general purpose computer (not shown) having a capability to transmit and receive data over network 10. However, GCS 24 is not limited to being a general purpose computer and may be specifically constructed for and dedicated to the purpose of providing telemetry, tracking, and control functions for network 10.

Generally, GCS process 34 defines the active/inactive status of cells 28 (see FIG. 2), assigns channels to cells 28, and makes a list of candidate target cells which SUs 26 (see FIG. 1) evaluate in making hand-off decisions. More specifically, GCS process 34 operates as a sequence of nested programming loops. An outer epoch loop, indicated by flow return line 36, processes numerous individual short time periods within a larger epoch. An intermediate local cell loop, indicated by flow return line 38, processes individual active cells for each time period. An inner cell cluster loop, indicated by flow return line 40, processes cells grouped into a cell cluster wherein a single local cell is included in each cell cluster.

Process 34 performs a task 42 to identify a next time period for which the positioning of satellites 12, their footprints 30, and cells 28 (see FIG. 2) will be simulated. This time period desirably extends for less than a few seconds. After task 42, a task 44 simulates the positioning of cells 28 during the identified time period and evaluates cell overlap 32 (see FIG. 2) to identify active and inactive cells. Generally speaking, when at least a predetermined fraction of the areas of two cells 28 overlap, task 44 defines one of the two cells as active and the other as inactive.

Next, a task 46 assigns communication channels to only the active cells. Conventional frequency reuse planning techniques may be followed to minimize the likelihood of interference between channels used in adjacent cells 28.

After task 46, a task 48 initiates local cell loop 38 to individually process each of the active cells 28. Task 48 identifies a next active cell 28 to be considered as a "local" cell for subsequent processing. After task 48, a task 50 identifies target cells 28 to which ongoing calls within the active/local cell 28 may be handed-off. Generally speaking, the target cells are adjacent to the local cell. In one preferred embodiment, the target cells are limited to residing in an approaching direction for cells 28 relative to an SU 26 (see FIG. 1). Next, a task 52 makes a cell cluster list 54, an exemplary block diagram of which is illustrated in FIG. 4.

Figure 4:
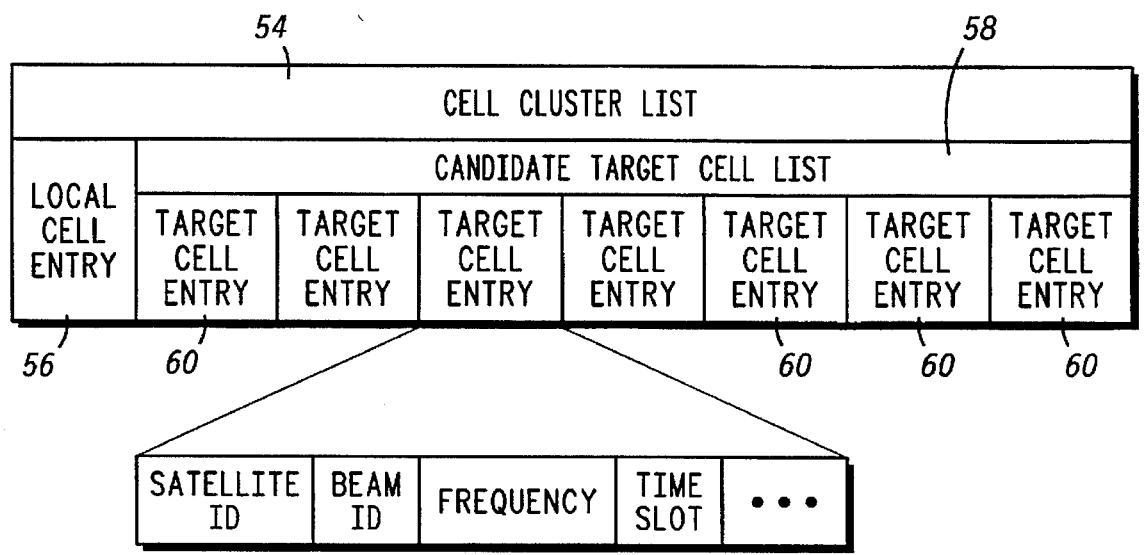
FIG. 4 shows a block diagram of a table organized to include any number of cell cluster lists.

Referring to FIG. 4, cell cluster list 54 includes data defining a local cell entry 56 and a candidate target cell list 58. Local cell entry 56 characterizes the local cell at task 52 (see FIG. 3). Candidate target cell list 58 includes a plurality of target cell entries 60. Target cell entries 60 characterize the various target cells identified in task 50 (see FIG. 3). Each of cell entries 56 and 60 includes data describing at least a satellite ID, a cell or beam ID, a frequency, and a time slot in a preferred embodiment. The satellite and beam IDs uniquely identify a cell 28 within network 10, and the frequency and time slot represent parameters which characterize a broadcast channel transmitted within the associated cell 28.

Referring back to FIG. 3, after task 52, a task 62 initiates cell cluster loop 40. Specifically, task 62 identifies another past time period relative to the current time period identified above in task 42. Desirably, loop 40 evaluates time periods for a few seconds prior to the current time period.

After task 62, a query task 64 determines whether any communication channel in cell cluster lists 54 (see FIG. 4) has experienced a change between the current and past time periods. The cell clusters evaluated by task 64 have identical local cells but occur in different periods of time. Communication channel changes can be identified by examining frequency and time slot information conveyed by local and target cell entries 56 and 60 (see FIG. 4) for corresponding cells 28 in current and past time periods. Channels may change, for example, due to inactivating or activating cells 28 at different points in time and then re-assigning communication channels to the resulting active cells.

If task 64 detects a channel change, a task 66 is performed to add the current cell entry to the past cell cluster list 54. Thus, the cell cluster list 54 for a past time period will include a cell entry 56 or 60 for both the past period and the current period if the channel changes between the periods. For the past time period, the cell cluster list 54 will include entries describing communication channels that are not then available but that will become available after the change.

After task 66 and when task 64 determines that no channel has changed, a query task 68 determines whether to end cell cluster loop 40. Cell cluster loop 40 ends when all time periods for a few seconds prior to the current time period have been evaluated. If cell cluster loop 40 is not yet ended, program control loops back to task 62 to evaluate another past time period relative to the current time period.

When cell cluster loop 40 ends, a query task 70 determines whether to end local cell loop 38. Local cell loop 38 ends when all active cells have been evaluated as local cells. If local cell loop 38 is not yet complete, program control loops back to task 48 to evaluate another active cell in the role of a local cell for the purpose of constructing cell cluster lists 54 (see FIG. 4). As local cell loop 38 continues, additional cell cluster lists 54 are formed for the current time period, and cell cluster lists 54 for past time periods may be altered to reflect upcoming channel changes.

When local cell loop 38 ends, a query task 72 determines whether to end epoch loop 36. Epoch loop 36 ends when all time periods within an epoch have been evaluated. In a preferred embodiment, the epoch may represent a length of time between 24 and 36 hours. If time periods remain to be evaluated, program control loops back to task 42 to evaluate network 10 at the next time period. As epoch loop 36 continues, additional cell cluster lists 54 are formed for active cells in additional time periods until a frequency assignment table for the entire epoch has been constructed.

When epoch loop 36 eventually ends, a task 74 sorts the frequency assignment table, if necessary, by satellite IDs, and a task 76 sends the satellite frequency assignment data to the respective satellites 12. Desirably, task 76 occurs before the first time period of the epoch for which GCS process 34 was performed. The respective satellites 12 save this data. Thus, satellites 12 have frequency assignment data and cell cluster lists 54 (see FIG. 4) stored therein for use when the epoch actually occurs.

After task 76, program control exits GCS process 34. However, process 34 is desirably performed again prior to the expiration of the just-simulated epoch.

Figure 5:
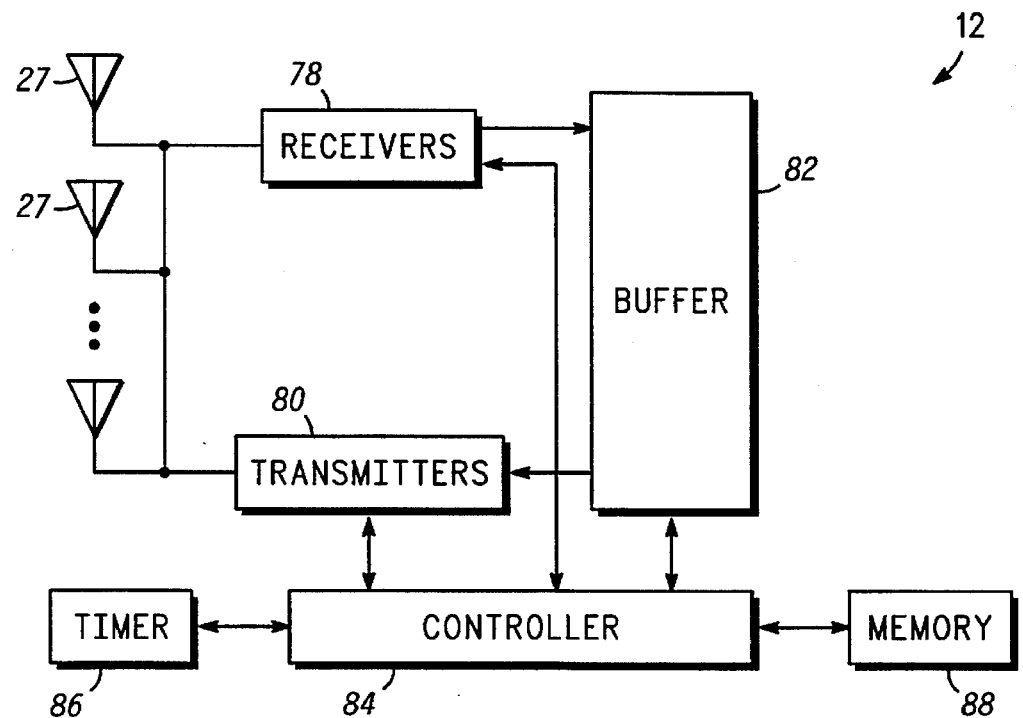
FIG. 5 shows a block diagram of a base station located in a satellite.

FIG. 5 shows a block diagram of a satellite base station 12. In a preferred embodiment, all satellites 12 have substantially the same structure. Satellite 12 includes antenna array 27, which couples to any number of receivers 78 and to any number of transmitters 80. Receivers 78 and transmitters 80 couple to a buffer section 82. Information packets received at receivers 78 are placed in buffer 82. Generally, the packets are indexed in buffer 82 so they can be extracted from buffer 82 and transmitted from satellite 12 toward their intended destinations. Of course, some information, such as the frequency assignment data discussed above in connection with task 76 (see FIG. 3) may be intended for satellite 12 and therefore not transmitted out from satellite 12. Likewise, other data, such as network control messages, may originate with satellite 12 without having been received at satellite 12.

A controller 84 couples to receivers 78, transmitters 80, buffer 82, a timer 86, and a memory 88. Controller 84 is desirably a programmable device, such as a microprocessor or the like, which performs operations defined by software instructions stored in memory 88. Timer 86 operates in a conventional manner to aid controller 84 in tracking the passage of time. Controller 84, under the direction of timer 86 and programing instructions stored in memory 88, controls the operation of receivers 78, transmitters 80, and buffer 82. Although not shown in FIG. 5, satellite 12 may include additional components such as additional controllers, batteries, solar panels, and the like.

FIG. 6 shows a flow chart of an exemplary satellite output process 90 performed by a satellite base station 12. In a preferred embodiment, substantially all satellites 12 perform process 90. Generally, process 90 is performed to send data packets to an SU 26 which is engaged in an ongoing call served by satellite 12. Of course, satellite 12 may simultaneously perform process 90 or its equivalent for any number of SUs 26, and satellite 12 may additionally perform other processes (not shown) which are not important to the present invention. Those skilled in the art will understand that software programming stored in memory 88 (see FIG. 5) causes satellite 12 to perform process 90.

FIG. 7 shows a data format diagram of an exemplary data packet 92 transferred from satellite 12 to an SU 26 under the direction of process 90 (see FIG. 6). Packet 92 includes a link control word 94 and payload data 96. Payload data 96 may, but need not, be digitized voice signals. Link control word 94 conveys overhead data that allow SU 26 and satellite 12 to communicate information which supports the delivery of payload data 96.

Referring back to FIG. 6, process 90 includes a query task 98 which determines whether the stream of call data flowing to the SU 26 is momentarily silent. Silence may be detected by an absence of payload data in buffer 82 for transmission over the communication channel allocated for use by the SU 26.

When task 98 identifies silence, a task 100 formulates a payload data message that includes the current entire cell cluster list 54 (see FIG. 4), including all cell entries 56 and 60. As discussed above, cell cluster lists 54 were distributed to satellites 12 from GCS 24 in accordance with task 76 (see FIG. 3). A current cell cluster list is one that has been prepared for the actual current instant in time. After task 100, a task 102 inserts link maintenance data into link control word (LCW) 94 (see FIG. 7). Generally, link maintenance data instruct an SU 26 to adjust power, frequency, timing, and the like. Link maintenance data need not be included in each packet 92 (see FIG. 7), but need to be sent to SU 26 sufficiently often to allow SU 26 to track changes in the communication link between satellite 12 and SU 26.

Next, a task 104 adds the link control word (LCW) 94 to packet 92, and a task 106 transmits packet 92 to SU 26. After task 106, process 90 may perform any number of additional tasks, as indicated in FIG. 6, then program control eventually returns to task 98 to continue processing the call data stream being transmitted to SU 26.

When task 98 determines that this call data stream is not momentarily conveying silence, process 90 performs a query task 108. Task 108 determines whether the link control word (LCW) 94 needs to convey link maintenance data. If link maintenance data are required, the non-silent payload data are inserted into packet 92, and program control proceeds to task 102, discussed above.

When task 108 determines that the link control word need not be dedicated to conveying link maintenance data, a task 110 points to a next cell entry 56 or 60 in the current cell cluster list 54 (see FIG. 4). Ordinarily, the next cell entry 56 or 60 is the one following the previously conveyed entry in the current list 54. But, if the previous entry was the final one of target cell entries 60, then the next cell entry starts over with the local cell entry 56.

After task 110, a task 112 inserts a sequence number that identifies which cell entry 56 or 60 has been selected and inserts the selected cell entry 56 or 60 into link control word (LCW) 94. Next, program control proceeds to task 104, discussed above, so that the packet 92 will be transmitted to SU 26.

Figures 8, 10:
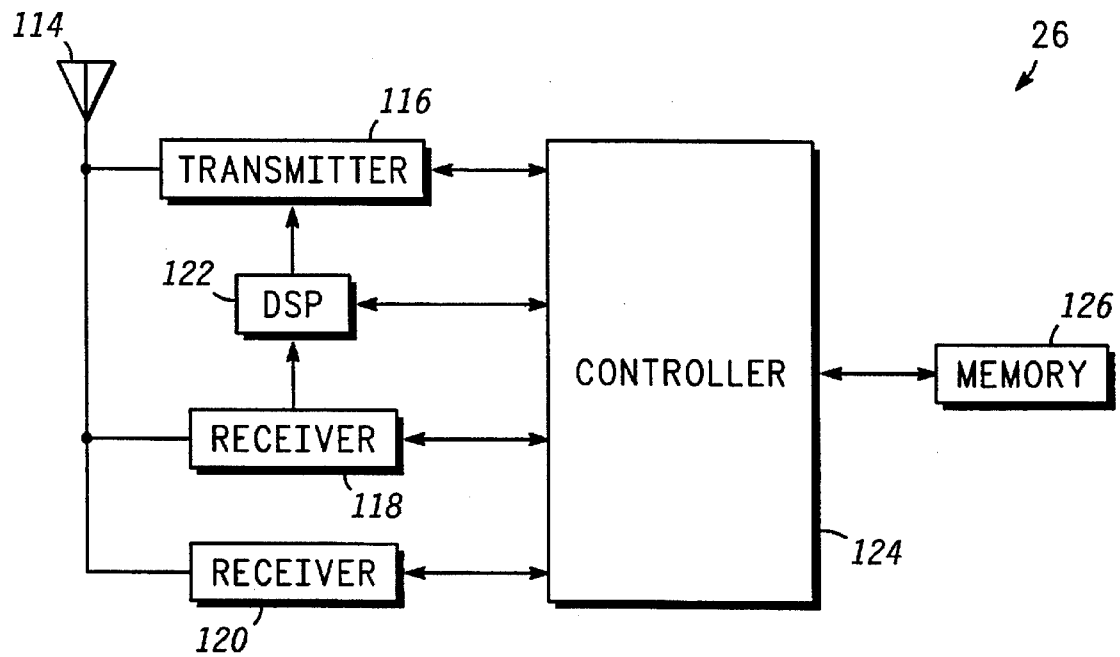
FIG. 8 shows a block diagram of a subscriber unit (SU)
FIG. 10 shows a block diagram of an exemplary cell cluster list maintained in a memory of the subscriber unit.

FIG. 8 shows a block diagram of a subscriber unit (SU) 26. SU 26 communicates with satellites 12 through an antenna 114. Antenna 114 couples to a transmitter 116 and to receivers 118 and 120. Receiver 118 and transmitter 116 couple to a digital signal processor (DSP) 122. DSP 122 extracts data from signals detected at receiver 118 and converts data transmitted from SU 26 into modulating signals which control transmitter 116.

A controller 124 couples to transmitter 116, receivers 118 and 120, DSP 122, and a memory 126. Controller 124 is desirably a programmable device, such as a microprocessor or the like, which performs operations defined by software instructions stored in memory 126. Controller 124, under the direction of programming instructions stored in memory 126, controls the operation of transmitters 116, receivers 118 and 120, and DSP 122. Although not shown in FIG. 8, SU 26 may include additional components such as additional controllers, batteries, vocoders, displays, keypads, microphone, loudspeaker, and the like.

Figure 9:
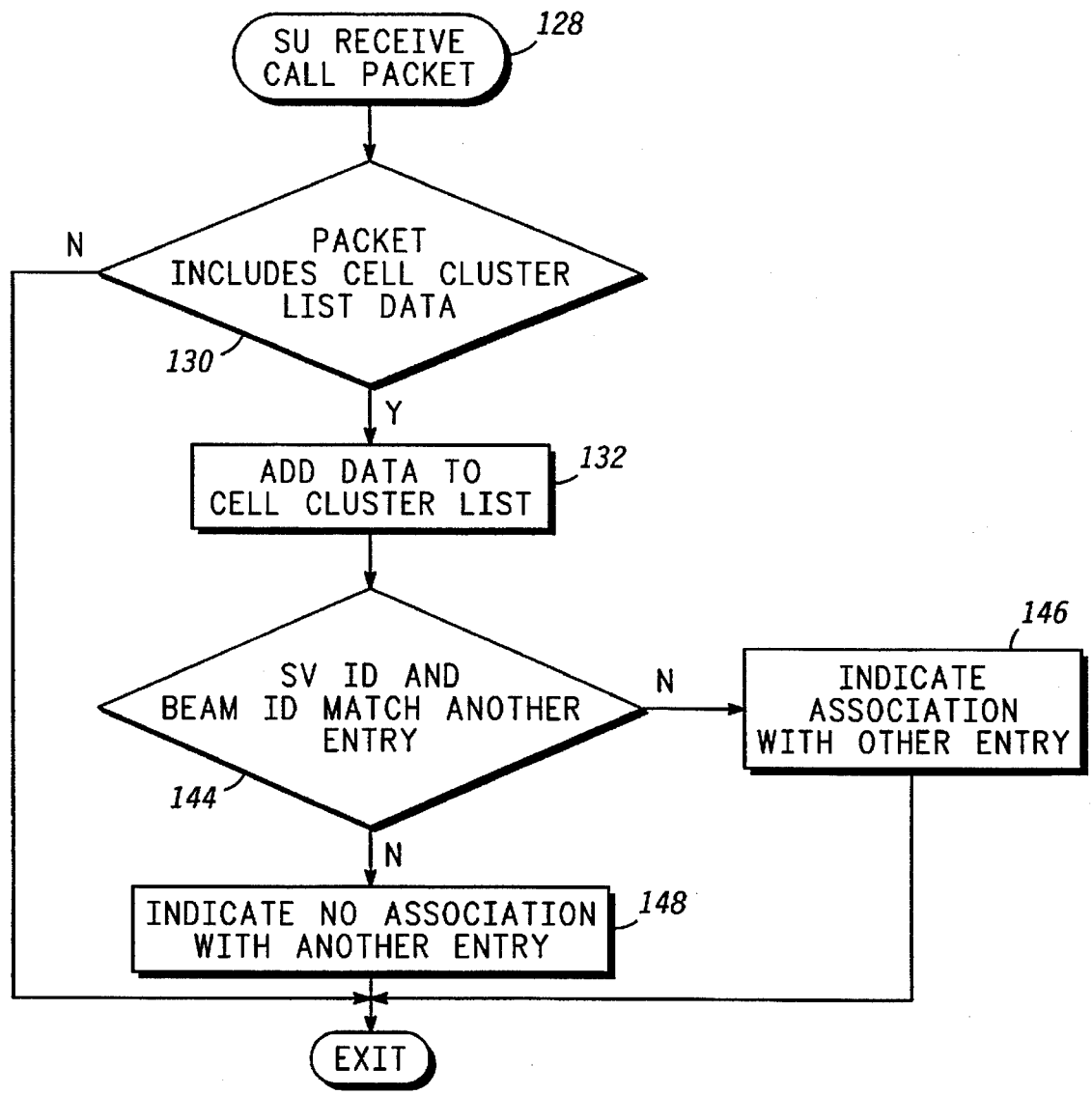
FIG. 9 shows a flow chart of a subscriber unit receive call packet process.

FIG. 9 shows a flow chart of a subscriber unit receive call packet process 128 performed by SU 26. Desirably, substantially all SUs 26 perform processes similar to process 128. SU 26 responds to the receipt of a packet 92 (see FIG. 7) during the course of an ongoing call through process 128. Those skilled in the art will understand that suitable software programing stored in memory 126 causes SU 26 to perform process 128 and other processes discussed below.

Process 128 includes a query task 130 which determines whether a just-received packet 92 (see FIG. 7) includes data from cell cluster list 54 (see FIG. 4). As discussed above in connection with FIGS. 6 and 7, such data may be included as payload data 96 or in a link control word 94. Alternatively, a packet 92 may omit such data. If task 130 determines that the packet 92 does not include data from cell cluster list 54, process 128 performs other tasks, as indicated in FIG. 9, then exits. The other tasks may include processing the payload data to provide voice signals for a user of SU 26. After exiting, program control may return to process 128 when the next packet 92 is received.

When task 130 determines that a just-received packet 92 (see FIG. 7) includes data from cell cluster list 54, a task 132 adds the data to a cell cluster list 134 maintained at SU 26.

FIG. 10 shows a block diagram of an exemplary cell cluster list 134 kept in memory 126 (see FIG. 8) of SU 26. List 134 includes a plurality of items stored in a predetermined sequence or otherwise associated with an index number 136. Each item includes a local or target cell entry 56 or 60 in association with a link 138, an instantaneous received signal strength (IRSS) indicator 140, and an average received signal strength (ARSS) indicator 142. Task 132 refreshes one or more of the items in list 134 by overwriting previously stored cell entries 56 or 60.

Referring back to FIG. 9, after task 132 a query task 144 determines whether the satellite (SV) ID and beam ID portions of the newly acquired cell entry or entries 56 or 60 (see FIG. 4) are identical to the satellite ID and beam ID in any other entry in list 134. If task 144 detects a match, then two entries in list 134 are directed to the same cell 28 (see FIG. 2). In other words, the cell entry is double-booked, and a task 146 adjusts the link data 138 corresponding to each entry to indicate the other entry and the double-booked status.

When task 144 fails to detect a match between satellite ID and beam ID for newly acquired data and other items in list 134, a task 148 adjusts link data 138 for the newly acquired entry to indicate no association or link with other items in list 134. After tasks 146 or 148, process 128 performs other tasks, as indicated, and then exits. However, process 128 may be performed again when another packet is received.

Figure 11:
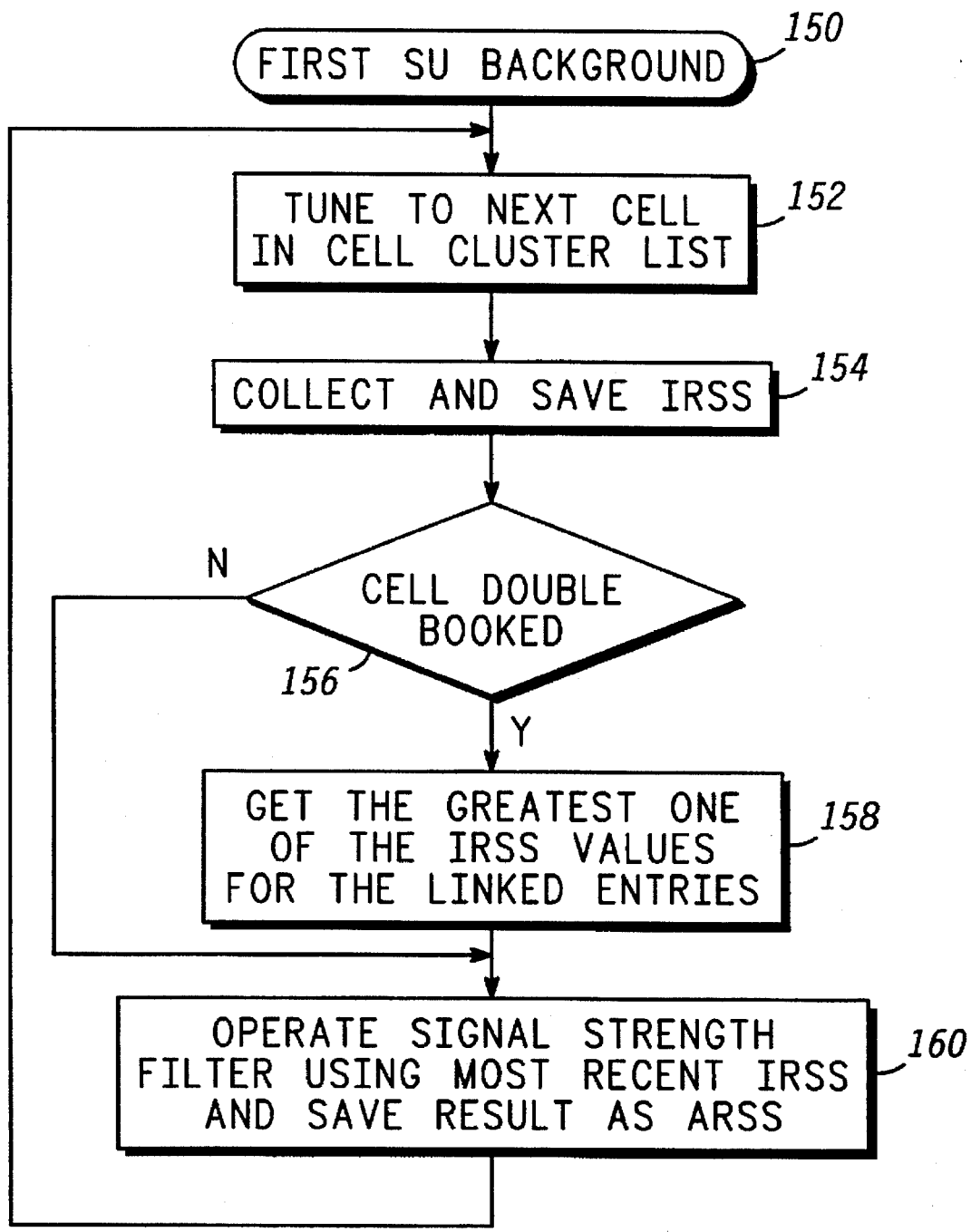
FIG. 11 shows a flow chart of a first subscriber unit background process.

FIG. 11 shows a flow chart of a first subscriber unit background process 150 performed by SU 26. Desirably, substantially all SUs 26 perform processes similar to process 150. SU 26 continuously performs process 150 in a background mode while a call is ongoing. Thus, process 150 is performed simultaneously with process 128 (see FIG. 9).

Process 150 includes a task 152 in which SU 26 tunes one of its receivers 118 or 120 (see FIG. 8) to the next cell 28 in cell cluster list 134 (see FIG. 10). In particular, task 152 controls a receiver 118 or 120 to tune to the frequency and time slot indicated in the next cell entry 56 or 60 (see FIGS. 4 and 10). For the purpose of process 150, either of receivers 118 or 120 is acceptable if it is not being used for other purposes, such as receiving a packet 92 (see FIG. 7). In a preferred embodiment, process 150 sequences through all items in cell cluster list 134 (see FIG. 10) one at a time and continuously repeats this sequence.

After task 152, a task 154 collects and saves an instantaneous received signal strength (IRSS) measurement 140 (see FIG. 10) at the communication channel to which the receiver 118 or 120 was tuned above in task 152. IRSS measurement 140 may be saved in list 134 (see FIG. 10). Next, a query task 156 determines whether the communication channel for which an IRSS measurement has just been made is double-booked in list 134 (see FIG. 10). Task 156 may make its determination by evaluating link 138 for the current item in list 134.

If task 156 determines that the cell is double-booked, a task 158 gets the greatest one of the double-booked IRSS values from list 134. The greatest IRSS is identified by evaluating IRSS 140 values for the two double-booked items in list 134. In other words, when the alternate one of the double-booked items has a greater IRSS value, task 158 will substitute that greater IRSS value for the IRSS value collected above in task 154.

After task 158 and when task 156 determines that the cell is not double-booked, process 150 performs a task 160. Task 160 operates a software signal strength filter for the subject cell using the IRSS value collected above in task 154 and possibly revised in task 158. The precise type of filtering is not important. Nevertheless, task 160 combines the current IRSS value with previous IRSS values to generate an average received signal strength or other value ARSS that represents collective IRSS values over a period of time. After task 160, process 150 may perform other tasks, as indicated, and program control eventually loops back to task 152 to evaluate signal strength for a communication channel projected to another cell 28. Process 150 remains active so long as a call is ongoing.

As a result of operating process 150, average received signal strength (ARSS) values 142 associated with the cell entries 56 or 60 in list 134 remain current. Moreover, when a communication channel changes, the ARSS value immediately after the change reflects about the same ARSS value which was valid immediately before the change. Thus, hand-off decisions based upon ARSS values are substantially unaffected by communication channel changes.

Figure 12:
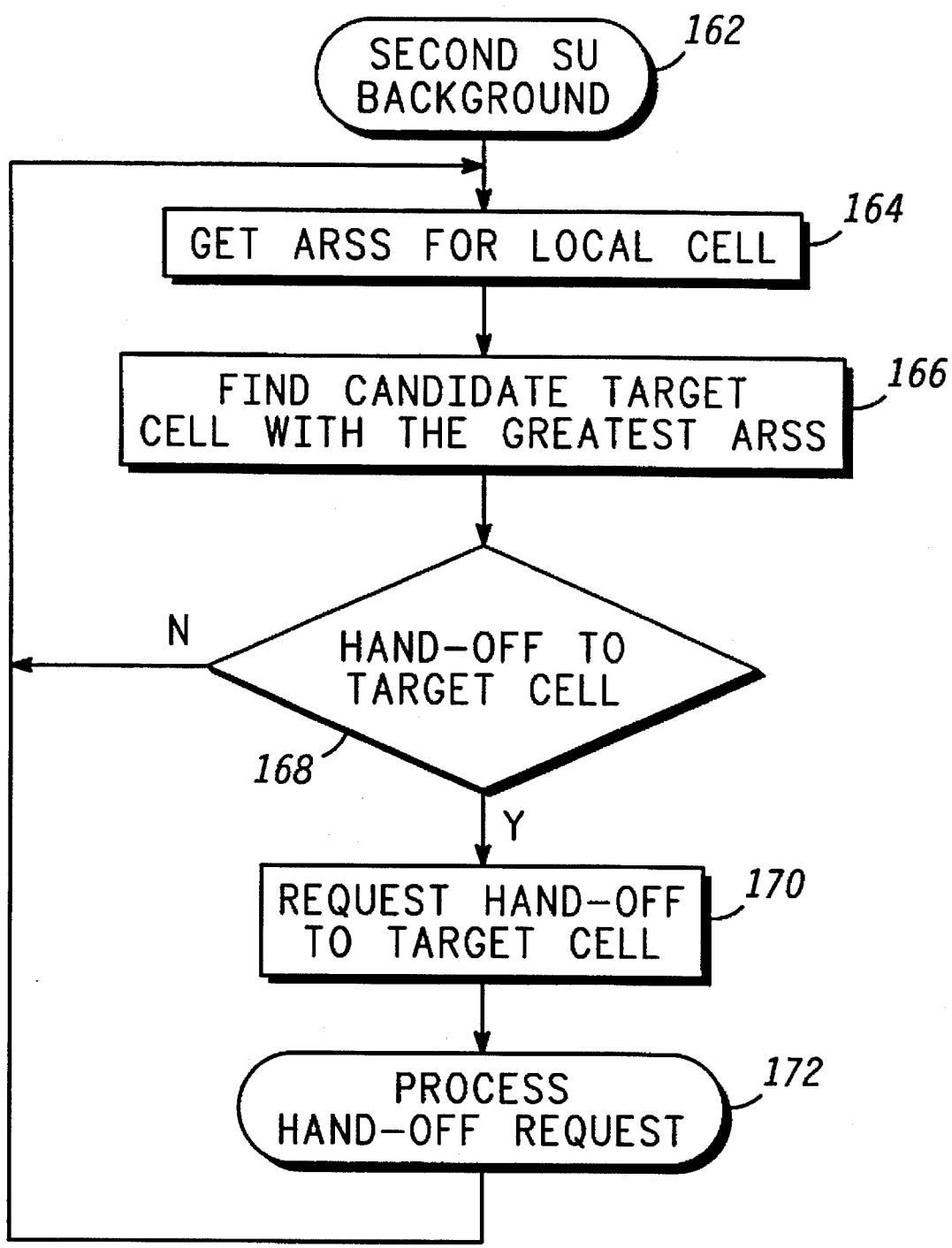
FIG. 12 shows a flow chart of a second subscriber unit background process.

FIG. 12 shows a flow chart of a second subscriber unit background process 162. Desirably, substantially all SUs 26 perform processes similar to process 162. SU 26 continuously performs process 162 in a background mode while a call is ongoing. Thus, process 150 is performed simultaneously with processes 128 (see FIG. 9) and 150 (see FIG. 11). Through process 162, SU 26 makes a hand-off decision based, at least in part, upon ARSS values.

Process 162 includes a task 164 that gets an ARSS value 142 (see FIG. 10) for the local cell 28. In the embodiment described herein, the local cell 28 represents the cell within which SU 26 is currently located and is described by the first item (index=0) in cell cluster list 134 (see FIG. 10). Next, a task 166 finds the candidate target cell entry 60 (see FIGS. 4 and 10) with the greatest ARSS.

After task 166, a task 168 makes a decision regarding whether to request a hand-off to the target cell identified above in task 166. Task 168 may, for example, decide to request a hand-off when the target cell has a greater ARSS. However, task 168 need not base the hand-off decision on this criteria alone. For example, task 168 may consider the absolute magnitude of the ARSS values for the local and target cells, the length of time since the previous hand-off request, geographic location data, and the like. In addition, task 168 may consider not only the target cell with the greatest ARSS but other target cell ARSS values as well.

When task 168 determines that a hand-off is not needed, program control loops back to task 164. So long as the call remains ongoing, program control will remain in the programming loop that includes tasks 164, 166, and 168 until task 168 determines that a hand-off is required.

When task 168 determines that a hand-off is required, a task 170 formats and sends a message to the satellite 12 serving SU 26. This message requests a hand-off to the one or more target cells identified above in task 166. After task 170, program control proceeds to a process 172 to process the hand-off request. During process 172, SU 26 awaits instructions from satellite 12 which informs SU 26 of a new communication channel which will be associated with the requested target cell. In addition, process 172 desirably includes provisions to verify that the request message was received at the satellite 12 and to resend the request from time to time if requests are denied or appear not to have been received. Process 172 is completed after the hand-off occurs. After process 172, program control loops back to task 164 to repeat the process for the new local cell.

SUMMARY

There has been described herein a concept, as well as several embodiments including a preferred embodiment, of an improved method and apparatus for performing hand-off wherein a subscriber unit evaluates hand-off candidates. The present invention implements a hand-off process compatible with the use of simple, light-weight, low-power, highly reliable base stations located in orbiting satellites. Hand-off decisions are made in subscriber units, and a base station need not include the complex processing elements needed to make hand-off decisions for an entire population of subscriber units supported by the base station. A hand-off process is implemented that accommodates frequent changes in frequency reuse plans adopted for cells. Subscriber units are informed of upcoming communication channel changes, look for the changes to occur, and configure an average received signal strength indicator to remain unaffected by the change.

The present invention has been described above with reference to preferred embodiments. However, those skilled in the art will recognize that changes and modifications may be made in these preferred embodiments without departing from the scope of the present invention. For example, those skilled in the art will appreciate that the precise processes, tasks, and task sequencing described herein may be considerably varied while achieving equivalent functions. These and other changes and modifications which are obvious to those skilled in the art are intended to be included within the scope of the present invention.

Accordingly, it is intended by the appended claims to cover all modifications of the invention which fall within the true spirit and scope of the invention.

What is claimed is:

1. A method for operating a subscriber unit in a cellular communication system that requests a hand-off from a local cell to a candidate target cell, each cell having a broadcast channel associated therewith, said broadcast channel comprised of a frequency and time-slot, and wherein each of said cells periodically change either the frequency and/or time-slot of said associated broadcast channel, said method comprising the steps of:

said subscriber unit receiving a first list of candidate target cells during momentary periods of silence during voice communication, said first list including a cell identifier (ID) and said broadcast channel for each candidate target cell;

on a regular basis, measuring, for each candidate target cell of said first list, an instantaneous signal strength of the associated broadcast channel;

receiving a second list of candidate target cells during subsequent momentary periods of silence during voice communication, said second list including a cell identifier (ID) and said broadcast channel for each candidate target cell, some candidate target cells of said second list having a same cell ID as candidate target cells of said first list but having different broadcast channels, said broadcast channel of some of said candidate target cells changing in between the steps of receiving said first and second lists of candidate target cells;

linking candidate target cells of said first and second lists having the same cell ID and different broadcast channels;

repeating the measuring step for each candidate target cell of said second list, and for said linked candidate target cells measuring said instantaneous signal strength of the different associated broadcast channel;

determining an average signal strength of the broadcast channel for each candidate target cell of said first and second lists, said average signal strength based on subsequent of said instantaneous signal strength measurements; and for the linked candidate target cells, selecting the greatest one of the instantaneous signal strengths for use in the averaging step.

2. A method as claimed in claim 1 wherein each of said steps are performed while said subscriber unit is engaged in a call, and wherein the methof further comprises the steps of:

comparing a signal strength of said local cell's associated broadcast channel with each of said average signal strengths of said candidate target cells; and requesting a hand-off to one of said candidate target cells when said average signal strength of said one candidate target cell exceeds said local cell's broadcast channel signal strength.

3. A method as claimed in claim 1 further comprising the step of selecting, in response to said comparing step, a desirable one of said target cells into which said call may be handed off, said selecting step comprises the steps of:

said subscriber unit determining, at a current location for said subscriber unit relative to said system, strength of a first signal projected toward a local cell;

said subscriber unit determining, at approximately said current location for said subscriber unit relative to said system, strength of a second signal projected toward a target cell; and said subscriber unit comparing said strengths of said first and second signals.

4. A method as claimed in claim 1 wherein said subscriber unit comprises one or more radio frequency receivers and wherein:

said first and second lists of candidate target cells include data which identify radio frequency communication channels which are projected toward said target cells; and said measuring steps comprise the step of tuning one or more of said receivers to said radio frequency communication channels identified in said list.

5. A method for operating a cellular communication system hand-off an ongoing call from a local cell to a candidate target cell, each cell having a broadcast channel associated therewith, said broadcast channel comprised of a frequency and time-slot, and wherein each of said cells periodically change either the frequency and/or time-slot of said associated broadcast channel, said method comprising the steps of:

transmitting, from a base station to said subscriber unit within said local cell, a first list of candidate target cells during momentary periods of silence during voice communication, said first list including a cell identifier (ID) and said broadcast channel for each candidate target cell;

transmitting to said subscriber unit a second list of candidate target cells during subsequent momentary periods of silence during voice communication, said second list including a cell identifier (ID) and said broadcast channel for each candidate target cell, some candidate target cells of said second list having a same cell ID as candidate target cells of said first list but having different broadcast channels, said broadcast channel of some of said candidate target cells changing inbetween the steps of receiving said first and second lists of candidate target cells;

receiving at said base station a hand off request from said subscriber unit, said hand-off request identifying one of said candidate target cells of either said first or second list, said subscriber unit measuring, on a regular basis, for each candidate target cell of said first list, an instantaneous signal strength of the associated broadcast channel, linking candidate target cells of said first and second lists having the same cell ID and different broadcast channels, repeating the measuring step for each candidate target cell of said second list, and for said linked candidate target cells measuring said instantaneous signal strength of the different associated broadcast channel, determining an average signal strength of the broadcast channel for each candidate target cell of said first and second lists, said average signal strength based on subsequent of said instantaneous signal strength measurements, for the linked candidate target cells, selecting the greatest one of the instantaneous signal strengths for use in the averaging step, comparing a signal strength of said local cell's associated broadcast channel with each of said average signal strengths of said candidate target cells.

6. A method as claimed in claim 5 wherein the transmitting and receiving steps, said base station is in a satellite placed in orbit above the earth.

7. A method as claimed in claim 5, wherein said transmitting step comprises the steps of:

evaluating whether a call information stream being conveyed from said base station to said subscriber unit has encountered a period of silence;

if not, combining a portion of said call information stream with a portion of said list of candidate target cells into a data packet; and if so, including said entire list of candidate target cells in said data packet.

8. A method as claimed in claim 5 wherein said subscriber unit comprises one or more radio frequency receivers and wherein subscriber unit tunes one or more of said receivers to broadcast channels identified in said first and second lists.

9. A method as claimed in claim 5 additionally comprising the steps of:

identifying a point in time when said broadcast channel associated with one of said target cells changes; and prior to said point in time, configuring said first list of candidate target cells so that data which identify said broadcast channel describe a communication channel used in one target cell of said first list before said point in time and so that said data which identify said broadcast channel describe a communication channel used in said one target cell in said second list after said point in time.

10. A method as claimed in claim 5 wherein said transmitting and receiving steps are performed while said base station is engaged in a call with said subscriber unit.

11. A radio telecommunication subscriber unit that requests a hand-off from a local cell to a candidate target cell, each cell having a broadcast channel associated therewith, said broadcast channel comprised of a frequency and time-slot, and wherein each of said cells periodically change either the frequency and/or time-slot of said associated broadcast channel, said subscriber unit comprising:

a receiver for receiving a first list of candidate target cells during momentary periods of silence during voice communication, said first list including a cell identifier (ID) and said broadcast channel for each candidate target cell;

said receiver for measuring on a regular basis, for each candidate target cell of said first list, an instantaneous signal strength of the associated broadcast channel;

said receiver for receiving a second list of candidate target cells during subsequent momentary periods of silence during voice communication, said second list including a cell identifier (ID) and said broadcast channel for each candidate target cell, some candidate target cells of said second list having a same cell ID as candidate target cells of said first list but having different broadcast channels, said broadcast channel of some of said candidate target cells changing inbetween the steps of receiving said first and second lists of candidate target cells;

a controller, coupled to said receiver, said controller being configured to link candidate target cells of said first and second lists having the same cell ID and different broadcast channels and to select a desirable one of said candidate target cells into which said call may be handed-off; and a transmitter, coupled to said controller, for transmitting a request message, said request message requesting a hand-off to said selected candidate target cell, said receiver configured to remeasure for each candidate target cell of said second list, to measure said instantaneous signal strength of the different associated broadcast channel for said linked candidate target cells, said controller configured to determine an average signal strength of the broadcast channel for each candidate target cell of said first and second lists, said average signal strength based on subsequent of said instantaneous signal strength measurements, and for the linked candidate target cells, to select the greatest one of the instantaneous signal strengths for use in the averaging step, and to compare a signal strength of said local cell's associated broadcast channel with each of said average signal strengths of said candidate target cells to determine said selected candidate target cell.

* * * * *